United States Patent
Sato

(10) Patent No.: US 7,607,785 B2
(45) Date of Patent: Oct. 27, 2009

(54) PROJECTION LENS AND PROJECTOR

(75) Inventor: Makoto Sato, Tachikawa (JP)

(73) Assignee: Casio Computer Co., Ltd., Tokyo (JP)

(*) Notice: Subject to any disclaimer, the term of this patent is extended or adjusted under 35 U.S.C. 154(b) by 167 days.

(21) Appl. No.: 11/809,861

(22) Filed: Jun. 1, 2007

(65) Prior Publication Data
US 2007/0279602 A1 Dec. 6, 2007

(30) Foreign Application Priority Data
Jun. 5, 2006 (JP) .............................. 2006-155769

(51) Int. Cl.
*G03B 21/14* (2006.01)
*G03B 21/28* (2006.01)
*G03B 3/00* (2006.01)
(52) U.S. Cl. ..................... 353/97; 353/99; 353/101
(58) Field of Classification Search ............... 396/257, 396/261, 262, 505–509; 353/30, 97, 99, 353/101, 102, 85; 359/643, 647; 348/68
See application file for complete search history.

(56) References Cited

U.S. PATENT DOCUMENTS 5,047,847 A * 9/1991 Toda et al. .................. 348/68
6,271,974 B2 * 8/2001 Wachi ........................ 359/697
2004/0109236 A1 * 6/2004 Nishioka .................... 359/643

FOREIGN PATENT DOCUMENTS

| JP | 01-133014 A | 5/1989 |
| JP | 2001-188196 A | 7/2001 |
| JP | 2003-322822 A | 11/2003 |
| JP | 2004-157346 A | 6/2004 |

OTHER PUBLICATIONS

Japanese Office Action (and English translation thereof) dated May 8, 2008, issued in a counterpart Japanese Application.

* cited by examiner

*Primary Examiner*—Melissa J Koval
(74) *Attorney, Agent, or Firm*—Frishauf, Holtz, Goodman & Chick, P.C.

(57) ABSTRACT

There is provided a projection lens for a projector which utilizes a reflection type display device, comprising a movable aperture 70 which is movable as a movable lens components moves, wherein an opening 75 in the movable aperture 70 is formed into a circular shape which is centered at the center of an optical axis 69 of the projection lens and has a swollen portion 73 on part of the opening 75 in such a manner as to project from a circumferential portion in a direction of the center of a beam of stray light into the interior of the opening 75.

15 Claims, 18 Drawing Sheets

PROJECTION LENS AND PROJECTOR

BACKGROUND OF THE INVENTION

1. Field of the Invention

The present invention relates to a projector unit for projecting an image based on image information such as a video signal and more particularly to a projection side optical system of a projector.

2. Description of the Related Art

Currently, in many cases, video projectors are used as image projection units for projecting, for example, a screen of a personal computer and a video image on to a screen and the like.

In projectors of this kind, a high intensity light source is incorporated, and light from the light source is shone through a light source side optical system where the light is sequentially split into red, green and blue light by the use of a red filter, a green filter and a blue filter. Then, these beams of red light, green light and blue light are concentrated into a light modulator such as a micromirror display device which is referred to as a liquid crystal device or a DMD (Digital Micromirror Device) by means of lenses and the like which make up an illumination side optical system, so that the light beams are then transmitted or reflected to be directed towards a projection opening in the projector while being controlled with respect to their quantities so as to display a fullcolor image on the screen.

The micromirror display device is such that microscopic mirror cells are tilted separately by control signals so as to control the direction of reflected light between an ON position, where light made to enter the micromirror display device by the illumination side optical system is reflected towards the projection lens which makes up the projection side optical system, the light so reflected being herein referred to an ON-state light, and an OFF position where the light that has so entered the micromirror display device is reflected towards a light absorber, the light so reflected being herein referred to as an OFF-state light, whereby time during which the red light, green light and blue light are reflected by the micromirror cells which are in the ON position is controlled so as to project a full-color image on to the screen.

In addition, there has been proposed a technology in which the white balance of a projector is regulated by making use of light which is reflected by micromirrors in the OFF position, more specifically, by detecting light which is reflected by the micromirrors in the OFF position so as not to be incident on the projection lens (for example, refer to the Japanese Unexamined Patent Publication No. 2001-188).

In addition, the liquid crystal display device is such as to cut off or transmit light which passes through microscopic liquid crystal cells so as to form an image, and in this liquid crystal display device, when focusing the light that has passed through the liquid crystal cells on to a screen by a projection lens, it has been proposed that a triangular opening is formed in the projection lens or an aperture is provided therein in order to enhance the contrast of an image formed (for example, refer to the Japanese Unexamined Patent Publication No. 2004-157346).

However, when increasing the opening in the illumination side optical system or the projection side optical system with a view to enhancing the brightness of an image projected by the projector, due to the expansion of the opening in the illumination side optical system, the diameters of a beam of ON-state light which is a beam of light made up of the ON-state light, a beam of OFF-state light which is a beam of light made up of the OFF-state light and a beam of stray light which is a beam of flat stray light which is a reflected light from a flat portion lying on the periphery of a cover glass of the display device or the mirror cells are also expanded.

Because of this, a chance of such stray light entering the projection lens which makes up the projection side optical system is increased and the amount of stray light which enters the projection lens is also increased in association with the expansion in diameter of the opening in the projection side optical system, resulting in a drawback that the contrast of an image formed is deteriorated by the stray light and the like.

The invention was made in view of the situations and an object thereof is to provide a projector lens which can form a bright and sharp image on to the screen by eliminating the drawback inherent in the related art and, hence, a projector which can obtain a sharp image.

SUMMARY OF THE INVENTION

With a view to attaining the object, according to a preferred aspect of the invention, there is provided a projection lens, which is a projection zoom lens for use in a projector utilizing a micromirror display device as a display device, the projection lens including a movable aperture adapted to move in an optical axis direction as a movable lens component moves, wherein an opening in the movable aperture is formed into a circular shape which is centered at an optical axis of the projection lens, the movable aperture has a swollen portion formed on part of a circumferential edge of the opening in such a manner as to project into the opening in a curvilinear fashion, and the swollen portion projects towards the opening from a circumferential edge portion which is in a direction of a center of a beam of stray light relative to a position of the optical axis of the projection lens.

In addition, according to another preferred aspect of the invention, there is provided a projector including a light source unit, a light source side optical system, an illumination side optical system, a micromirror display device, a projection side optical system having a zooming function, a power supply circuit, and a projector control unit, wherein the projection side optical system comprises a movable aperture adapted to move in an optical axis direction as a movable lens component moves in the optical axis direction, and wherein the movable aperture includes a circular opening centered at a position of an optical axis of the projection side optical system, and has a swollen portion, formed on a circumferential edge portion that is in a direction of a center of a beam of stray light relative to the center of the opening, in such a manner as to project in a direction of the center of the opening.

Thus, the invention provides the projector projection lens which can form a bright and sharp image on a screen and hence the projector which can obtain a sharp image.

DETAILED DESCRIPTION OF THE PREFERRED EMBODIMENT

Figure 1:
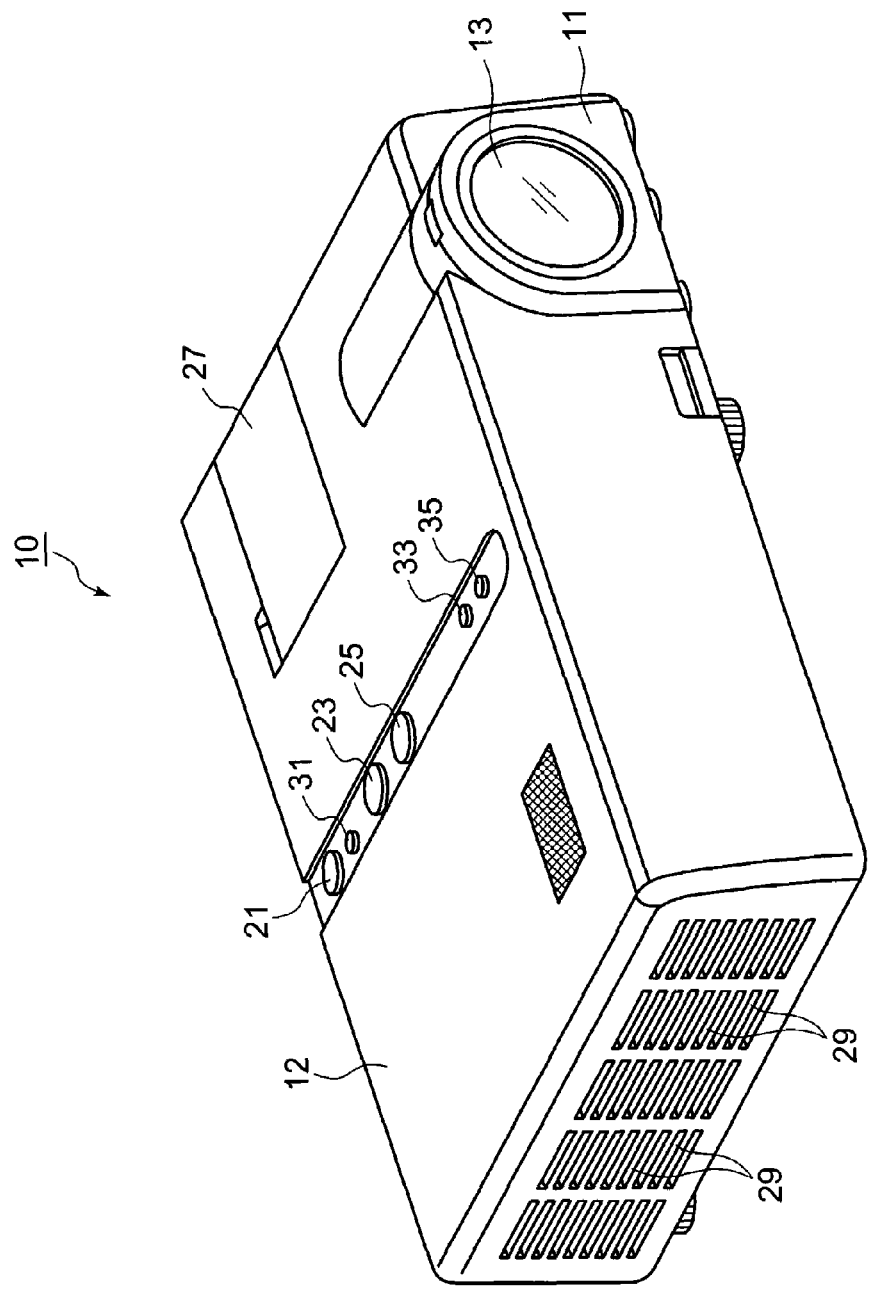
FIG. 1 is a drawing showing an external appearance of a projector according to the invention.

A best mode of a projector according to the invention incorporates therein a microcomputer for controlling a micromirror display device 51 and the like based on inputted video signals and has a light optical unit 41, a light source side optical system which includes a color wheel 43, a light guiding rod 45 and the like, an illumination side optical system which includes illumination lenses 46, a mirror 47 and the like, the micromirror display device 51 which includes a condenser lens 55 which makes light incident on the micromirror display device 51 from the illumination side optical system into a beam of parallel light and a cover glass 53 and, furthermore, a projection lens 60 which functions as a projection side optical system made up of lens components which are made into a zoom lens for projecting an image on to a screen and the like by a beam of ON-state light emerging from the display device 51 and has a movable aperture 70.

The movable aperture 70 of the projection lens 60 having the zooming function is provided within an airspace defined between lens components in such a manner as to move in a direction of an optical axis 69 as a movable lens component moves when the projection lens 60 is put into a zooming state. In addition, the movable aperture 70 has an annular ring portion 71 which forms a circular opening 75 which is centered at the optical axis 69 of the projection lens 60. The movable aperture 70 also has a circular arc-like swollen portion 73 which is formed on the ring portion 71 which constitutes a circumferential edge portion of the circular opening 75 in a direction of the center of a beam of stray light R in such a manner as to project from the ring portion 71 into the opening 75, so as to cut off part of light of a beam of ON-state light P passing through the opening 75 which lies on a side facing the beam of stray light R together with stray light by a swollen portion 73.

The projector according to the invention is a projector 10 which incorporates therein the microcomputer as a projector control unit and has, as is shown in FIG. 1, a projection opening 13, in which a lens cover 11 is fitted, on a front side of a casing which is formed substantially into a rectangular parallelepiped shape and on an upper side of the casing control keys and indicators such as a power supply key 21, an automatic image quality control key 23, a manual image quality control key 25, a power supply indicator 31, a light source lamp indicator 33, an overheat indicator 35 and the like. In addition, the projector 10 has on aback side thereof, not shown, various signal input terminals such a power supply connector, USB terminals for connection with a personal computer or the like, a video terminal into which an image signal is inputted and a mini D-sub terminal.

Additionally, the projector 10 has sub-keys for setting various operations of the projector 10 as well as performing the control of image qualities and images inside a closing lid 27 provided on the upper side of the casing and air intake and exhaust openings 29 formed in lateral sides of the casing through which air is let in and out by a cooling fan.

Figure 2:
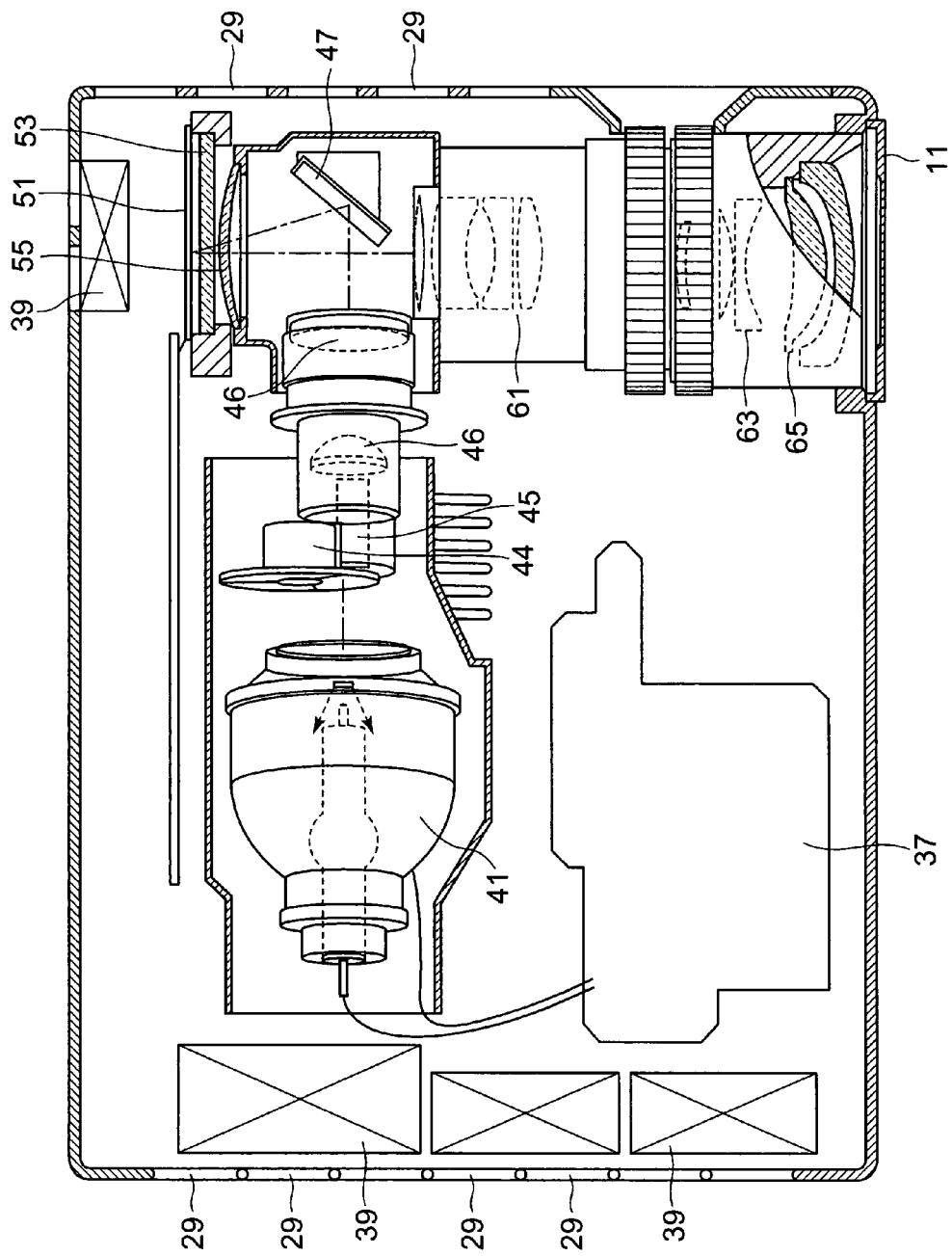
FIG. 2 is a drawing showing an internal construction of the projector according to the invention.

As is shown in FIG. 2, the projector 10 has in an interior thereof the light source 41 which incorporates therein an ultra-high pressure mercury lamp and the like, the color wheel 43 and the light guiding rod 45 as the light source side optical system, and the plurality of illumination lenses 46 and the single mirror 47 as the illumination side optical system.

Furthermore, the projector 10 additionally incorporates therein the microcomputer as a projector control unit for controlling the illumination of the lamp of the light source 41 and the display device 51 based on image signals and a circuit board 37 having thereon a power supply circuit for supplying the cooling fan 39 as well as the light source 41 and the projector control unit with electric power.

The color wheel 43 is a circular disk on which a red filter segment, a green filter segment and a blue filter segment which are disposed thereon in a circumferential fashion and is driven by a wheel motor 44 so that a white light emitted from the light source 41 is sequentially split into a red light, a green light and a blue light, which make up three primary colors, by allowing the white light to pass through the respective filters.

In addition, the light guiding rod 45 is such as to direct the lights that have passed through the color wheel 43 towards the illumination lenses 46 of the illumination side optical system while making the intensity of the lights emerging from the color wheel 43 uniform, and the illumination lenses 46 are such as to cause the lights that have passed through the light guiding rod 45 to concentrates into the micromirror display device 51.

The mirror 47 is such as to shine the lights that have emerged from the illumination lenses 46 on to the micromirror display device 51 from an oblique direction when mirror cells of the micromirror display device 51 are tilted to one direction so that lights reflected on the display device 51 travel towards a front side of the display device 51.

In addition, this mirror 47 is such as to shine lights reflected thereon on to the micromirror display device 51 from a direction in which a difference in angle between axes of a beam of ON-state light P which is reflected towards the front side of the micromirror display device 51 and a beam of OFF-state light Q which is reflected from the display device 51 when the mirror cells of the display device 51 are tilted to the other direction is increased.

The micromirror display device 51 is a rectangular DMD (Digital Micromirror Device) which is 10 or more millimeters long and wide and on which 500,000 to one million and several hundreds thousand microscopic mirror cells are disposed into a lattice shape, and each mirror cell is provided in such a manner as to tilt through an angle of 10 or more degrees to one and the other directions.

The cover glass 53 which protects the micromirror device 51 and the condenser lens 55 which makes light reflected from the mirror 47 of the illumination side optical system into a beam of parallel light for incidence into the display device 51.

Figure 3:
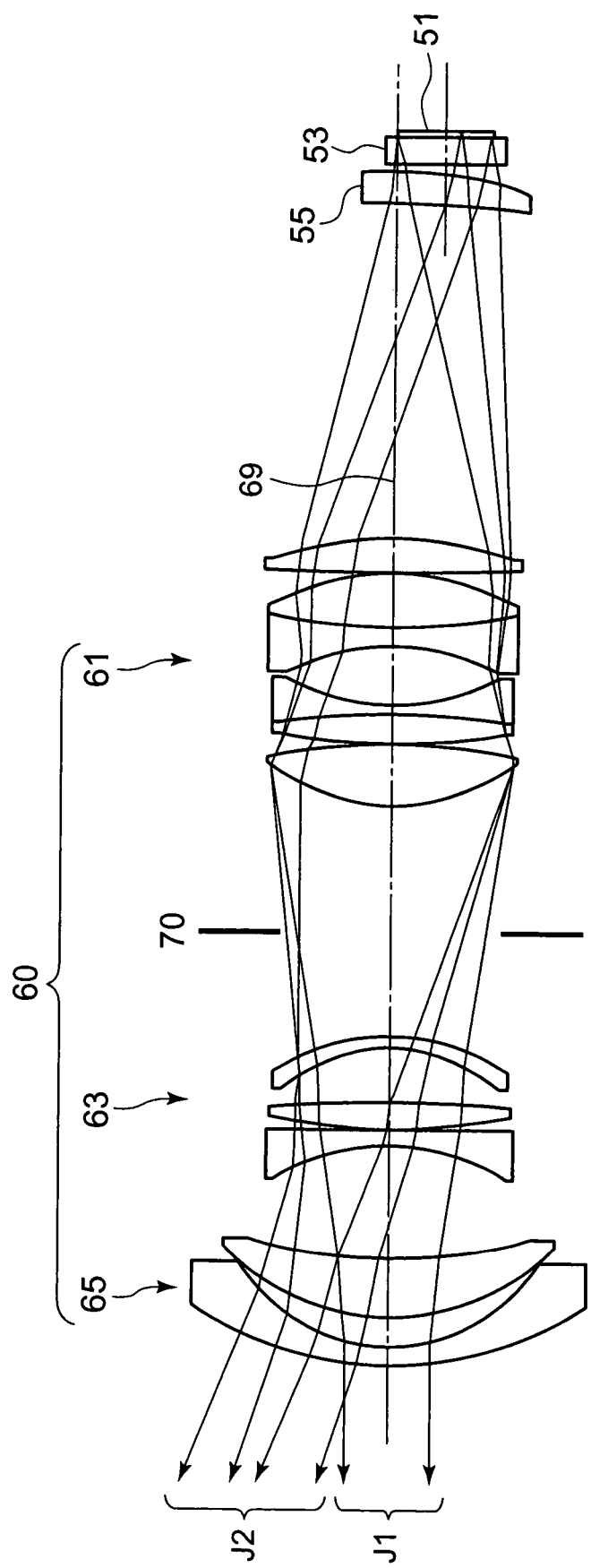
FIG. 3 is an exemplary drawing showing a projection side optical system of the projector according to the invention.

In addition, as is shown in FIG. 3, beams of ON-state light P which have been reflected squarely by the micromirror display device 51 are then incident on the projection lens 60 functioning as the projection side optical system which is disposed ahead of the display device 51, and the projection lens 60 is made into a variable focus lens made up of a fixed lens component 61, a primary movable lens component 63 and a secondary movable lens component 65 and with which a zooming magnification control and a focus control of an image projected on to the screen are enabled. The projection side optical system, which is made up of this zoom lens, has the movable aperture 70 within an airspace defined before or behind the primary movable lens component 63.

Figure 4:
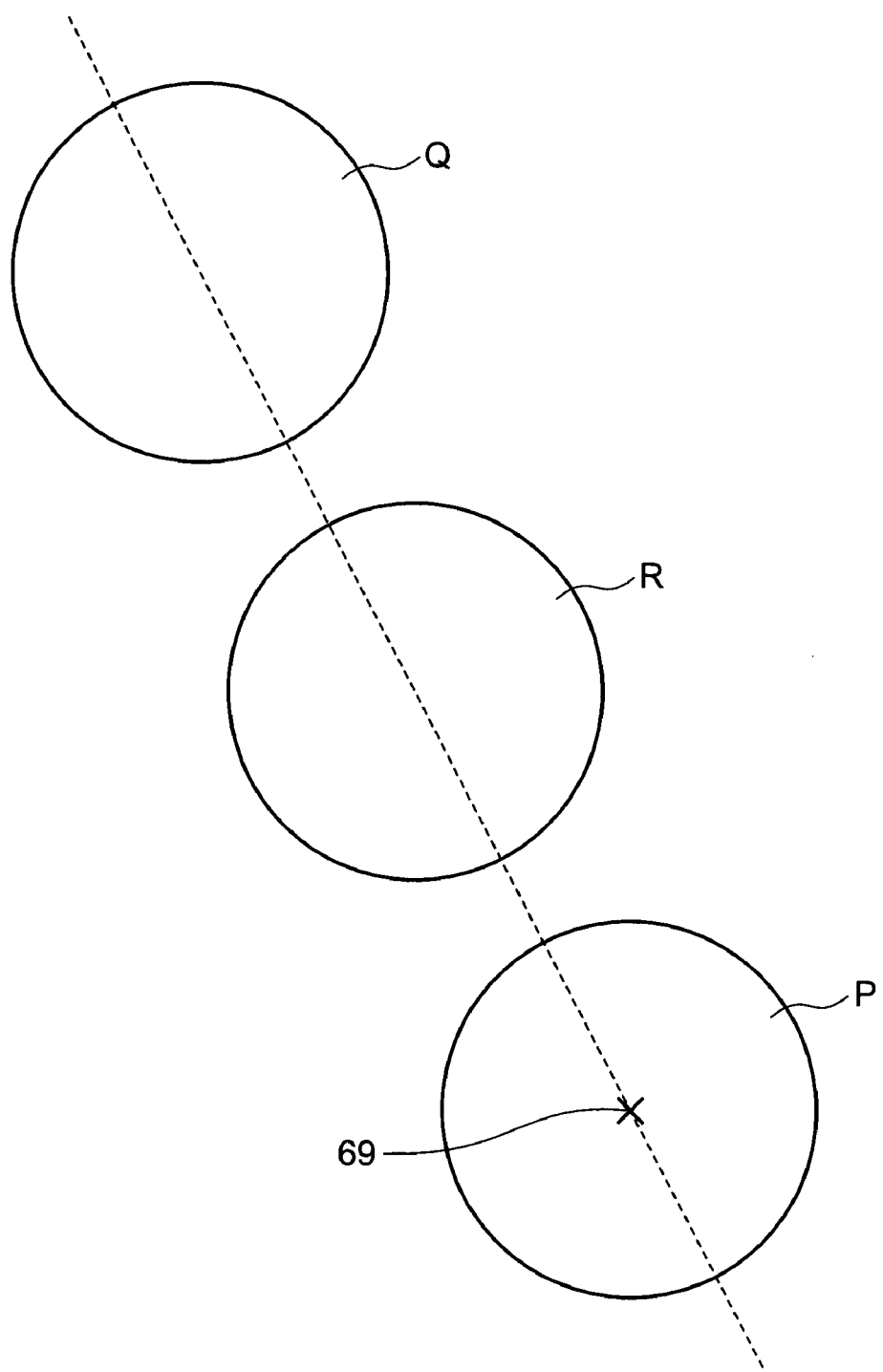
FIG. 4 is a drawing showing exemplarily a beam of ON-state light, a beam of OFF-state light and a beam of stray light in the projector.

Consequently, as is shown in FIG. 4, a beam of ON-state light P is formed which is centered at the optical axis 69 of the projection lens 60, which makes up the projection side optical system, at the position of this movable aperture 70, and theoretically, a beam of stray light R made up of flat stray light reflected from the flat planes of the cover glass 53 and the display device 51 is formed in such a manner as to be close to the beam of ON-state light P, and a beam of OFF-state light Q is formed close to the beam of stray light R in an opposite direction to the beam of ON-state light P.

Figure 5A:
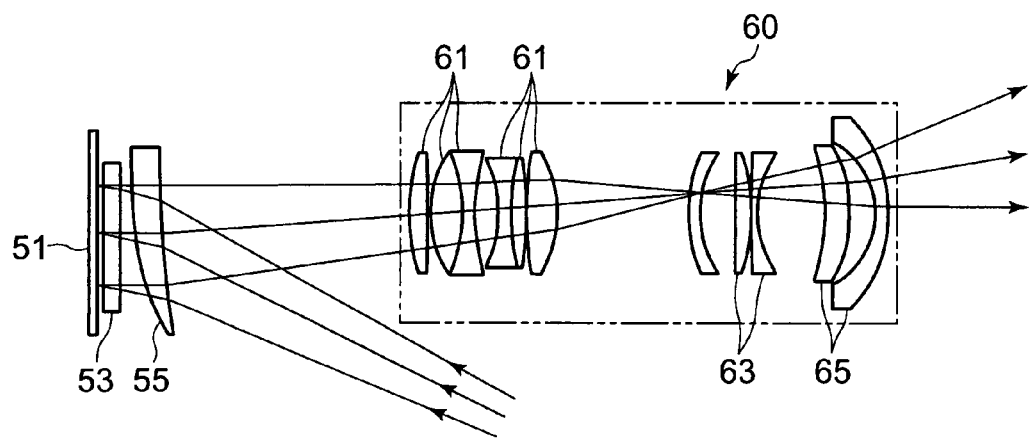
FIG. 5A is a drawing showing exemplarily a relationship between the beam of ON-state light and the projection side optical system inside the projector.
Figure 5B:
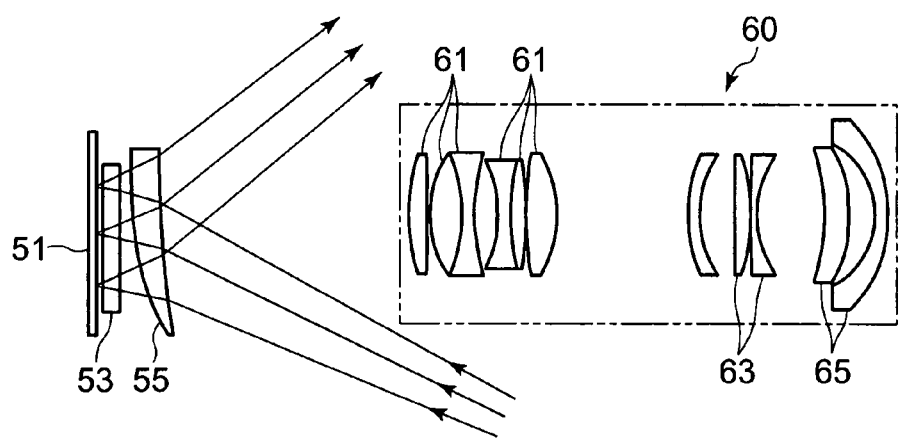
FIG. 5B is a drawing showing exemplarily a relationship between the beam of OFF-state light and the projection side optical system inside the projector.

Namely, when light incident on the micromirror display device 51 from the mirror 47 is reflected by the display device 51, as is shown in FIG. 5A, the beam of ON-state light P is incident on the projection lens 60, which makes up the projection side optical system, in parallel with the optical axis 69 of the projection side optical system or in such a manner as to intersect the optical axis 69 slightly, while as is shown in FIG. 5B, the beam of OFF-state light Q is reflected by the display device 51 in directions in which the reflected light is not incident on the projection lens 60.

Figure 5C:
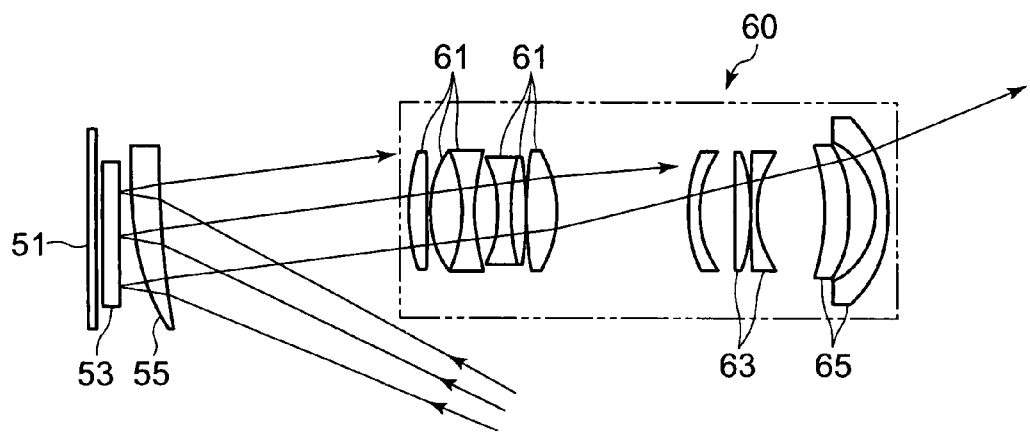
FIG. 5C is a drawing showing exemplarily a relationship between the beam of stray light and the projection side optical system inside the projector.

The beam of stray light R, which is made up of a slight quantity of light which is reflected on surfaces of the cover glass 53 of the DMD, which is the micromirror display device 51, and a peripheral portion of the mirror cells of the DMD which are normal to the optical axis of the projection lens 60 and light which is reflected by other flat surface portions of the surface of the display device 51 than the portion where the mirror cells are disposed display, is reflected in an intermediate direction between the beam of ON-state light P and the beam of OFF-state light Q, and the arrangement of the display device 51 and the projection side optical system and the incident angle of light which is incident on the display device 51 from the mirror 47 of the light source optical system are set such that most of the beam of stray light R is not incident on the projection side optical system. However, as is shown in FIG. 5C, part of the stray light is allowed to be incident on the projection lens 60 from an incident side of the projection side optical system and is then allowed to emerge from the projection lens 60 to reach the screen for deterioration of an projected image on the screen.

Because of this, the position and configuration of the movable aperture 70 and the arrangement of the projection side optical system are determined so that the stray light which incident on the projection lens from the incident side of the projection side optical system is also absorbed by an internal wall of a lens barrel and is cut off by the movable aperture 70 so as not to pass through the projection lens 60.

Note that theoretically, the centers of the beam of ON-state light P, beam of OFF-state light Q and beam of stray light R are aligned with one another on a straight line.

Thus, the projection lens 60 of the invention is such that part of the stray light is made to be absorbed by the internal wall of the lens barrel by making the beam of ON-state light P and the beam of stray light R close to each other and is furthermore cut off by the movable aperture 70 and that a distance between the projection lens 60 and the condenser lens 55 is decreased so as to miniaturize the projector 10. As is shown in FIG. 6, with a view to attaining the above, the movable aperture 70 is made to have the annular ring portion 71 which is formed into a circular shape as viewed externally and which has inside the opening 75 with a radius r, and the swollen portion 73 is formed on part of the opening in such a manner as to project into the opening 75 from the ring portion 71.

Figure 6:
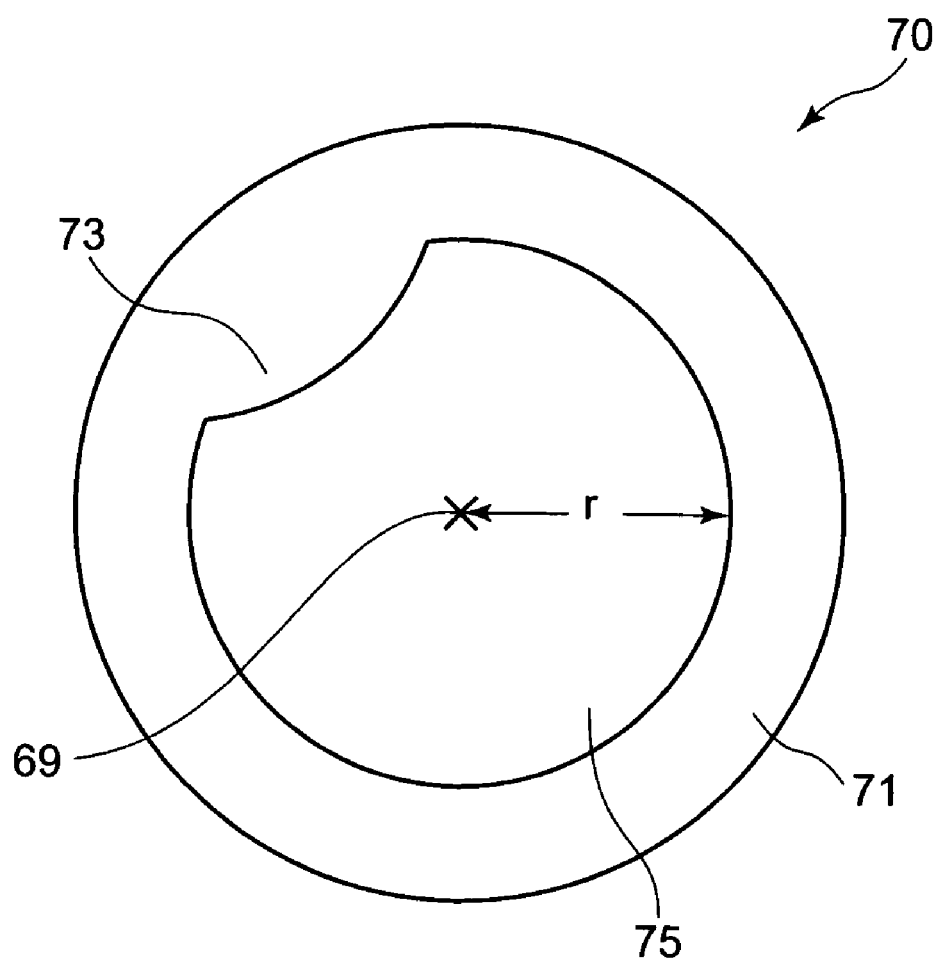
FIG. 6 is a drawing showing a movable aperture for use in the projector according to the invention.
Figure 7:
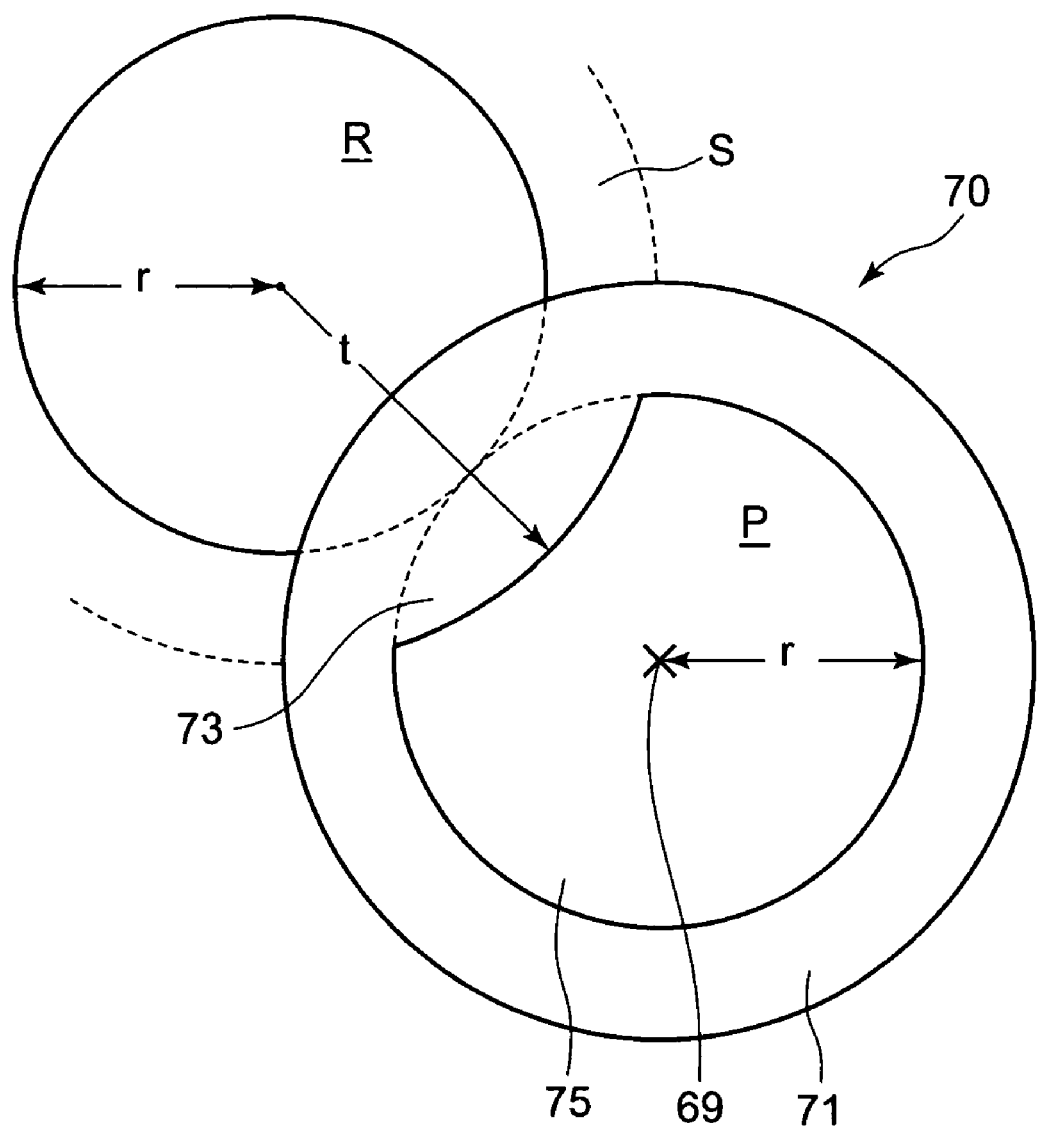
FIG. 7 is a drawing showing exemplarily a state in which stray light is cut off by the movable aperture in the projector according to the invention.

Furthermore, as is shown in FIG. 6 and in FIG. 7, the movable aperture 70 is incorporated in the projection side optical system in such a manner that the center of the opening 75 coincides with the optical axis 69 of the projection lens 60, and the swollen portion 73 is such as to project into the interior of the opening 75 in an arc-like fashion and is formed into an arc with a radius t which is centered at the center of the beam of stray light R which contacts the beam of ON-state light P and has a radius r which is the same as that of the beam of ON-state light P.

In this way, since an outer circumferential edge of the beam of ON-state light P and an outer circumferential edge of the beam of stray light R are theoretically made tangent to each other and the swollen portion 73 is provided on part of the circular opening 75 with a position lying twice of the radius r of both the beams of such lights away from the optical axis 69 of the projection lens 60 made to be the center of curvature of the arc-shaped swollen portion 73, even in the event that a diffusion area S is brought about on the perimeter of a range of the theoretical beam of stray light R which lies adjacent to the theoretical beam of ON-state light P, stray light which is diffused in the diffusion area S can be cut off by the swollen portion 73 so as to form a sharp image.

Figure 8:
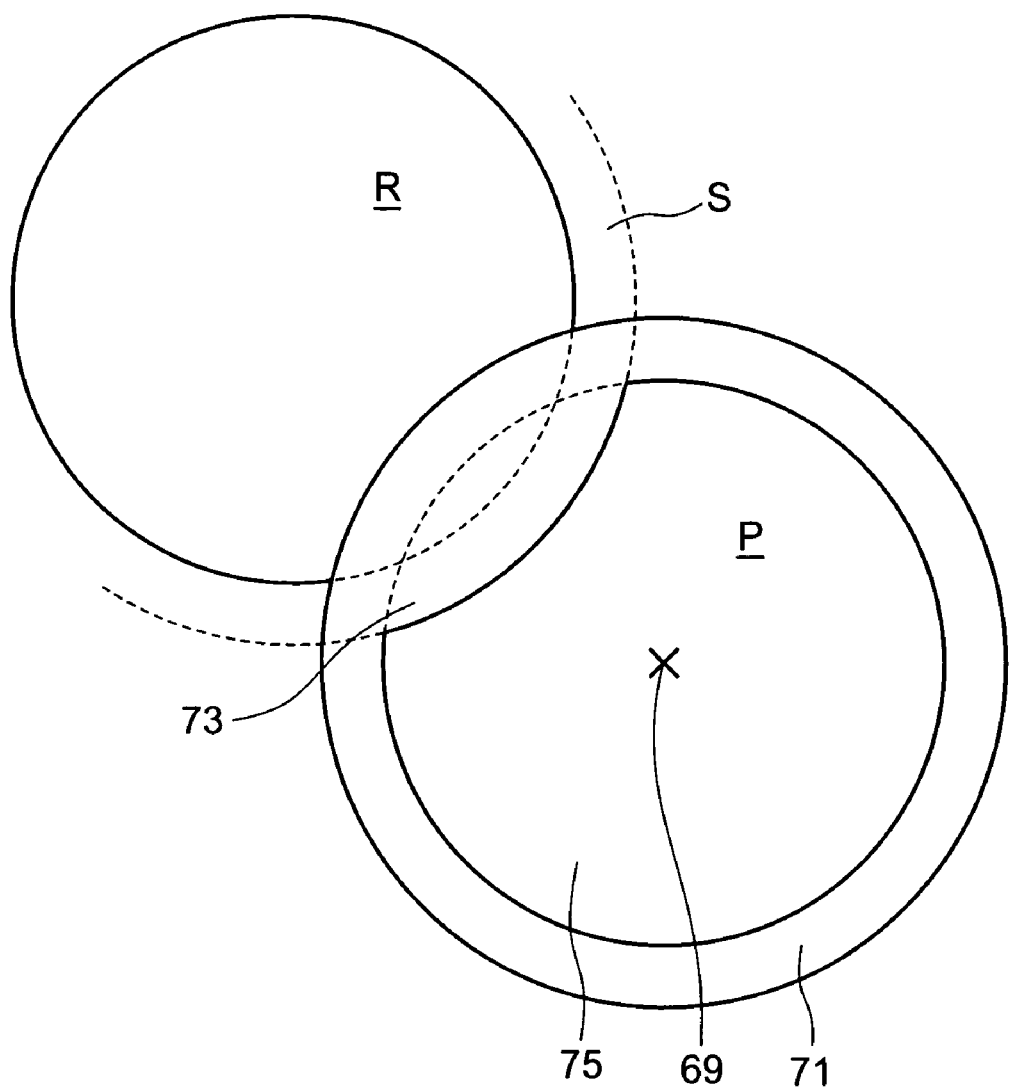
FIG. 8 is a drawing showing exemplarily an example in which an opening of the movable aperture in the projector is expanded according to the invention.

In addition, since stray light which lies close to the beam of ON-state light P can be cut off by the swollen portion 73, as is shown in FIG. 8, the diameter of the opening 75 can be increased, so as to increase a total quantity of ON-state light which passes through the movable aperture 70, so that a bright projection image can be formed.

Namely, the radius of the opening 75 where the external edge of the beam of ON-state light P and the external edge of the beam of stray light R overlap each other is determined by the direction of the normal of the display device, the reflection angle of the beam of ON-state light P from the display device 51, the reflection angle of the OFF-state light Q from the display device, the distance from the display device 51 to the movable aperture 70, the F number of the fixed lens component 61 and the like, whereby the aperture size of the projection lens 60 can be increased, and the arc-shaped swollen portion 73 is formed which projects into the opening 75 from the ring portion 71 in the direction of the center of the beam of OFF-state light Q so as to cut off the theoretical beam of stray light R and stray light in the diffusion area S thereof, and a bright and sharp projection image is formed.

Figure 9:
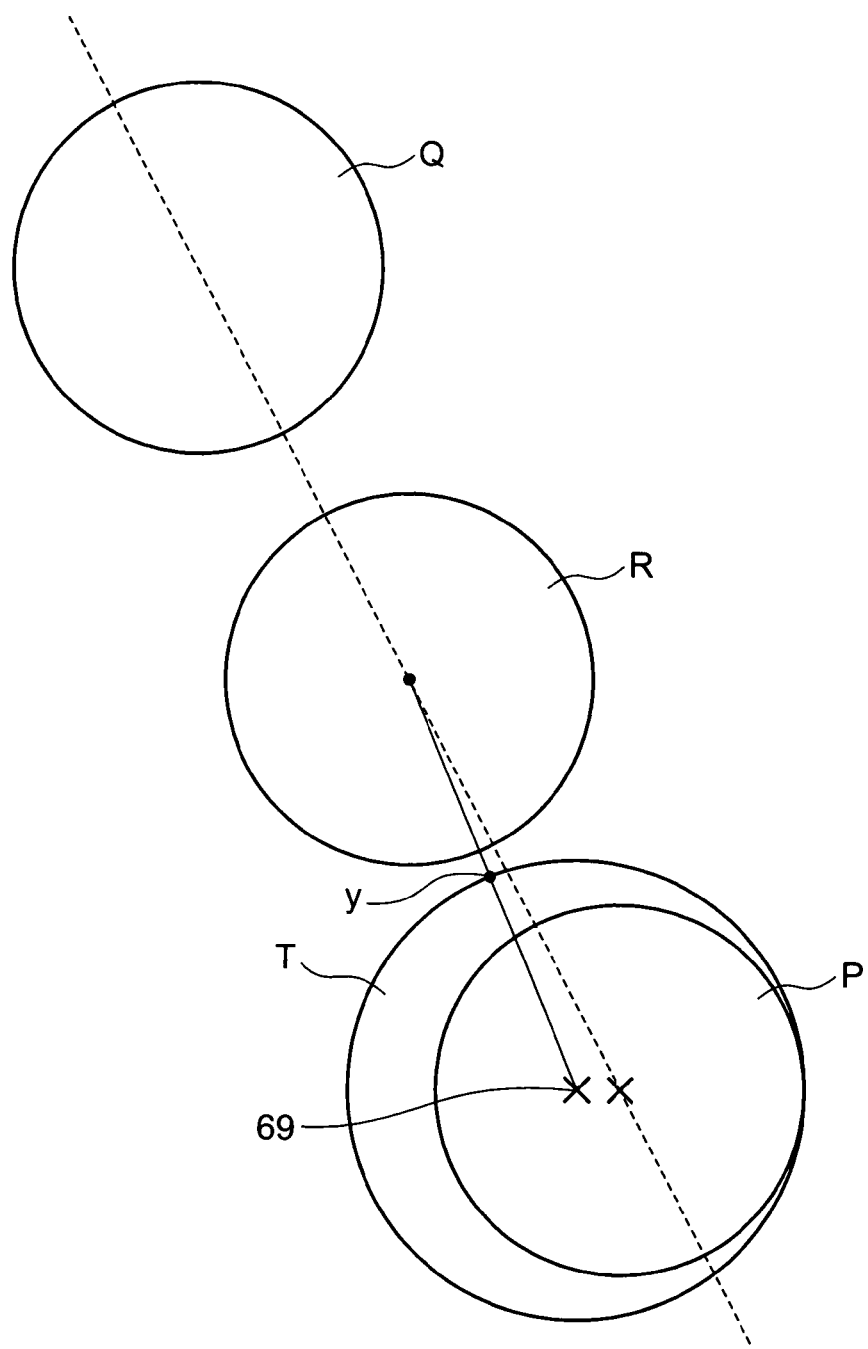
FIG. 9 is a drawing showing exemplarily a positional relationship between the beam of ON-state light, beam of OFF-state light and beam of stray light and an optical axis of a projection lens in the projector.

Furthermore, even with a projector 10 in which not only the optical axis 69 of the projection lens 60, which is the projection side optical system, is aligned with the center of the beam of ON-state light P, as is shown in FIGS. 4 and 7, but also the optical axis 69 of the projection lens is shifted in a parallel direction so that the optical axis 69 deviates from the center of the beam of ON-light P with a view to preventing the interference of the mirror 47 of the illumination side optical system with the ON-state light, there may occur a case where the aperture of T of the projection lens 60 is increased, as is shown in FIG. 9, so as to prevent a reduction in quantity of ON-state light which is incident on the projection side optical system.

Also in this case, stray light can be cut off effectively by a movable aperture 70 on which a swollen portion 73 is formed in a position on a circumferential edge portion y of the projection lens 60 which is directed from the optical axis 69 towards, among the centers of the beam of ON-state light P, beam of stray light R, and beam of OFF-state light Q which are theoretically aligned with one another on the straight line, the center of the beam of stray light R.

Then, the positioning of the movable aperture 70 so configured when disposed in an airspace defined between lens components is determined by obtaining a position where stray light becomes densest through simulations by a computer because optical paths of ON-state light and stray light differ depending upon a combination of single lenses which make up the projection lens 60 having the zooming function by the projection side optical system.

Figure 10:
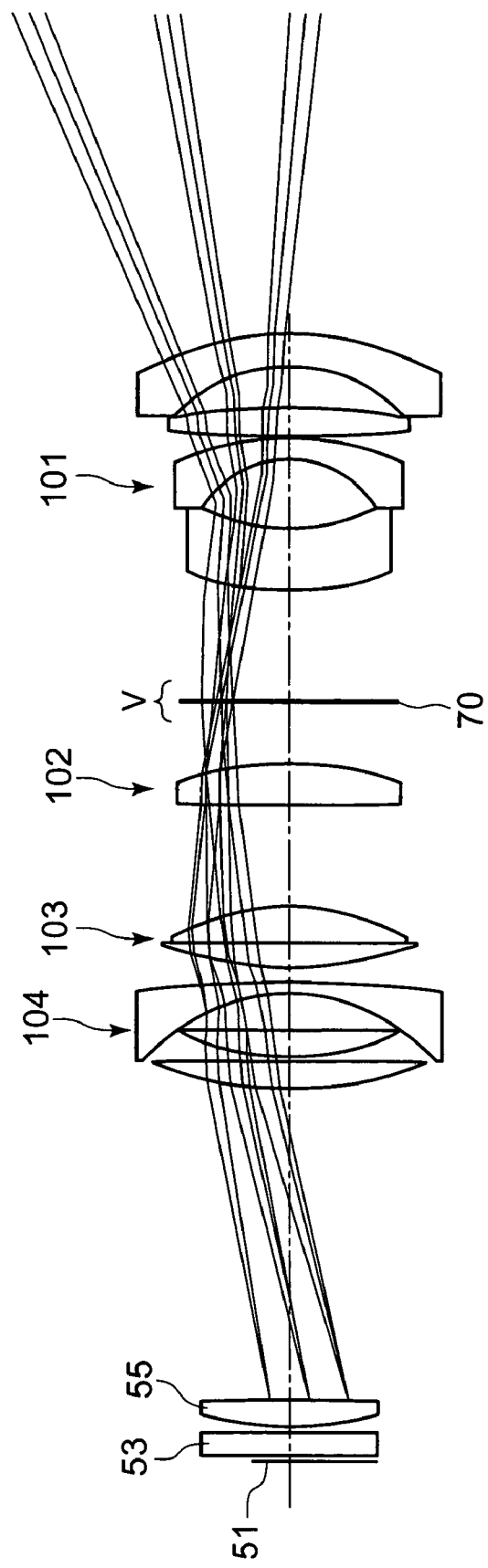
FIG. 10 is a drawing showing exemplarily a state of the beam of stray light in a state in which the projection side optical system is at a wide-angle end in the projector according to the invention.

For example, with a four-component zoom lens as is shown in FIG. 10, by such computer simulations, a densest position V is obtained where the cross sectional area of the beam of stray light R becomes the smallest and hence, stray light gets compacted within airspaces defined between lens components between a first movable lens component 101 to a fourth movable component 104 as viewed in order from the front of the zoom lens.

The respective lens components shown in FIG. 10, that is, the first movable lens component 101, second movable lens component 102, third movable lens component 103 and fourth movable lens component 104 are all lens components which can move in the optical axis direction, and the positions of the respective lens components shown in FIG. 10 show positions thereof which result when the projection lens 60 is in a wide-angle end state.

Figure 11:
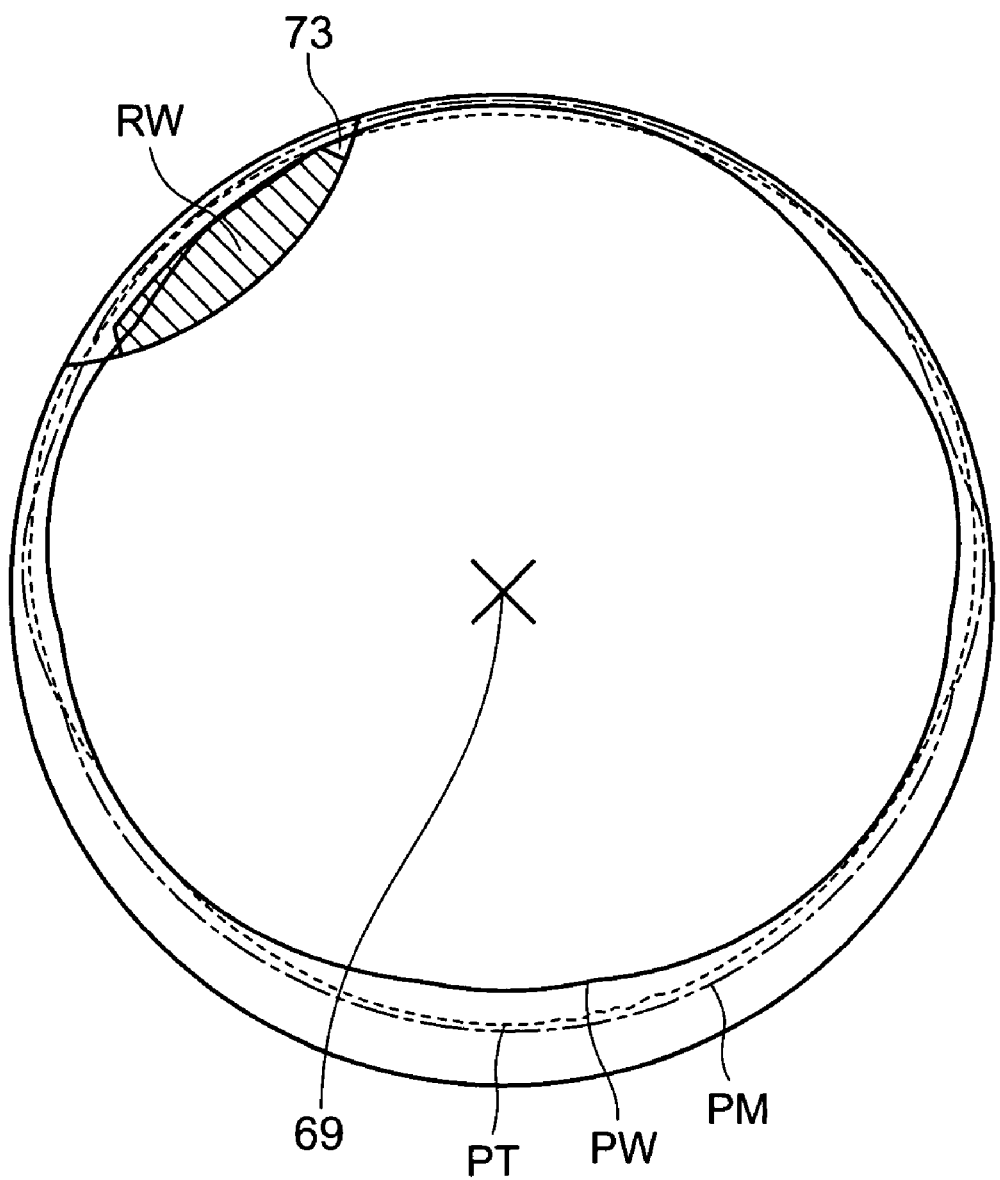
FIG. 11 is a drawing showing a state of a beam of light at a position where a beam of stray light is made densest in the projector according to the invention.

Furthermore, a configuration of the beam of stray light R in the densest position V is obtained through simulations, and as is shown in FIG. 11, a configuration of the swollen portion 73 which covers an area RW of the beam of stray light R is determined so as to cut off the beam of stray light R.

Figure 12:
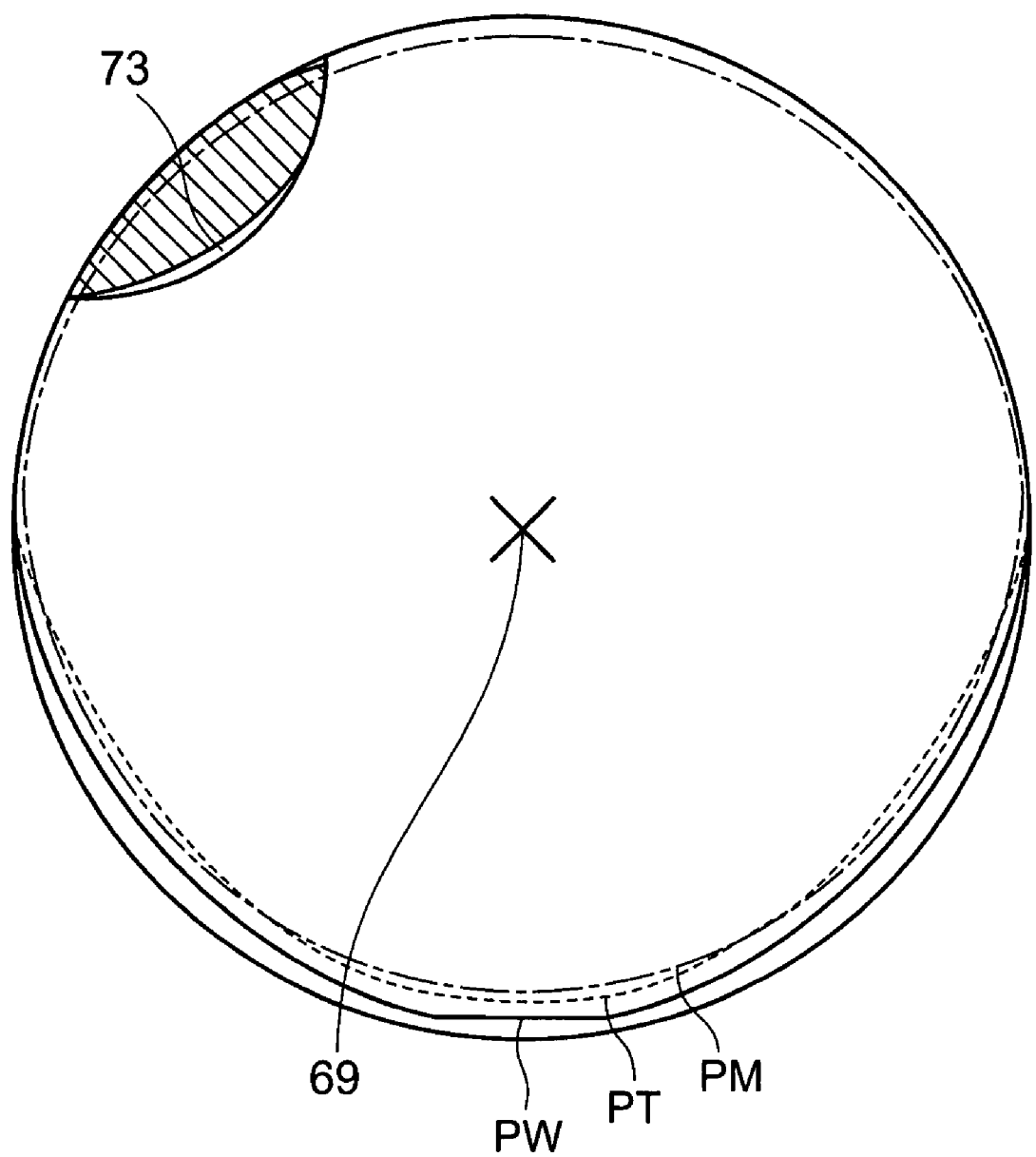
FIG. 12 is a drawing showing a state of a beam at a position on a surface of a lens in the projector according to the invention.

Among surfaces of single lenses which make up the first movable lens component 101 to the fourth movable lens component 104 which form the projection lens 60, the area RW of the beam of stray light R is formed, as is shown in FIG. 12, in the position of the surface of the second movable lens component 102 where the beam of stray light R becomes densest. Then, when the swollen portion 73 is formed in such a manner as to cut off the beam of stray light R, a beam of ON-state light PW which results when the projection lens 60 is in the wide-angle end state is subjected to an attenuation of 3.4 percent by the swollen portion 73.

In place of cutting off the beam of stray light R in the position of the lens surface of the second movable lens component 102, in the event that the swollen portion 73 for cutting off the beam of stray light R is formed by positioning the movable aperture 70 having the swollen portion 73 in the densest position V, as shown in FIG. 11, the attenuation by the swollen portion 73 of the beam of ON-state light PW resulting in the wide-angle end state can be decreased to 2.4 percent.

Then, when the projection lens 60 is shifted to the wide-angle end state to a telephoto end state by sequentially changing the zooming ratio of the projection lens 60 made up of the first movable lens component 101 to the fourth movable lens component 104, the area of the beam of ON-state light P is changed and the area of the beam of stray light R is also changed, whereby the area of the beam of stray light R in the position of the surface of the second movable lens component 102 slightly appears on a circumferential edge of the lens surface of the projection lens 60 which is now being in the telephoto end state.

Figure 13:
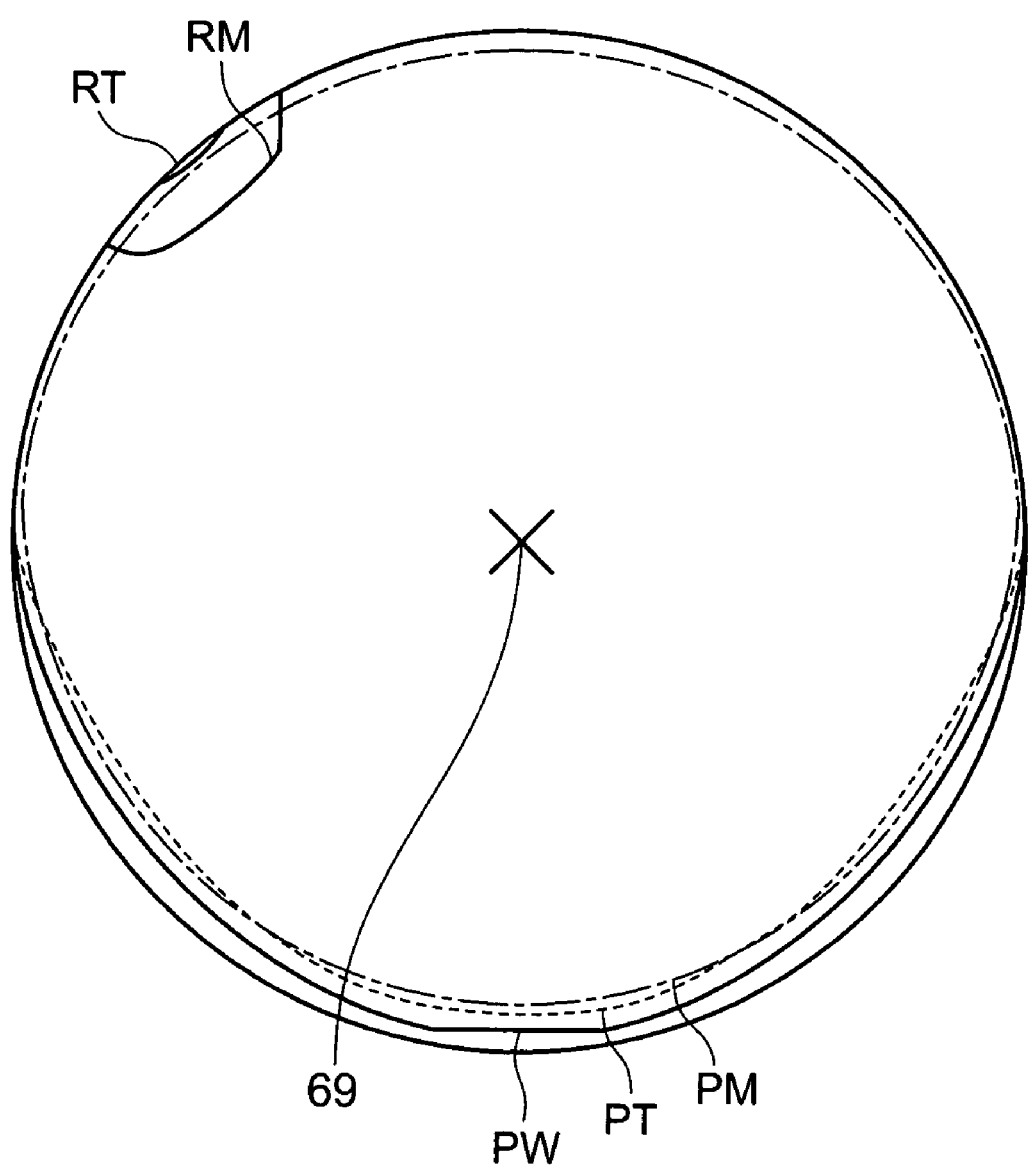
FIG. 13 is a drawing showing a change in the state of the beam of light at the position on the surface of the lens in the projector according to the invention.

Namely, as is shown in FIG. 13, with the projection lens 60 in the telephoto end state, an area RT of the beam of stray light R appears as an extremely narrow area, and an area RM of the beam of stray light R resulting when the projection lens 60 is in a middle state appears as larger than the area RT in the telephoto end state but smaller than the area RW in the wide-angle end state shown in FIG. 12.

As this occurs, as is shown in FIG. 13, the beam of ON-state light P changes from the area PW of the beam of ON-state light in the wide-angle end state to an area PT of the beam of ON-state light in the telephoto end state via an area PM of the beam of On-state light in the middle state.

Figure 14:
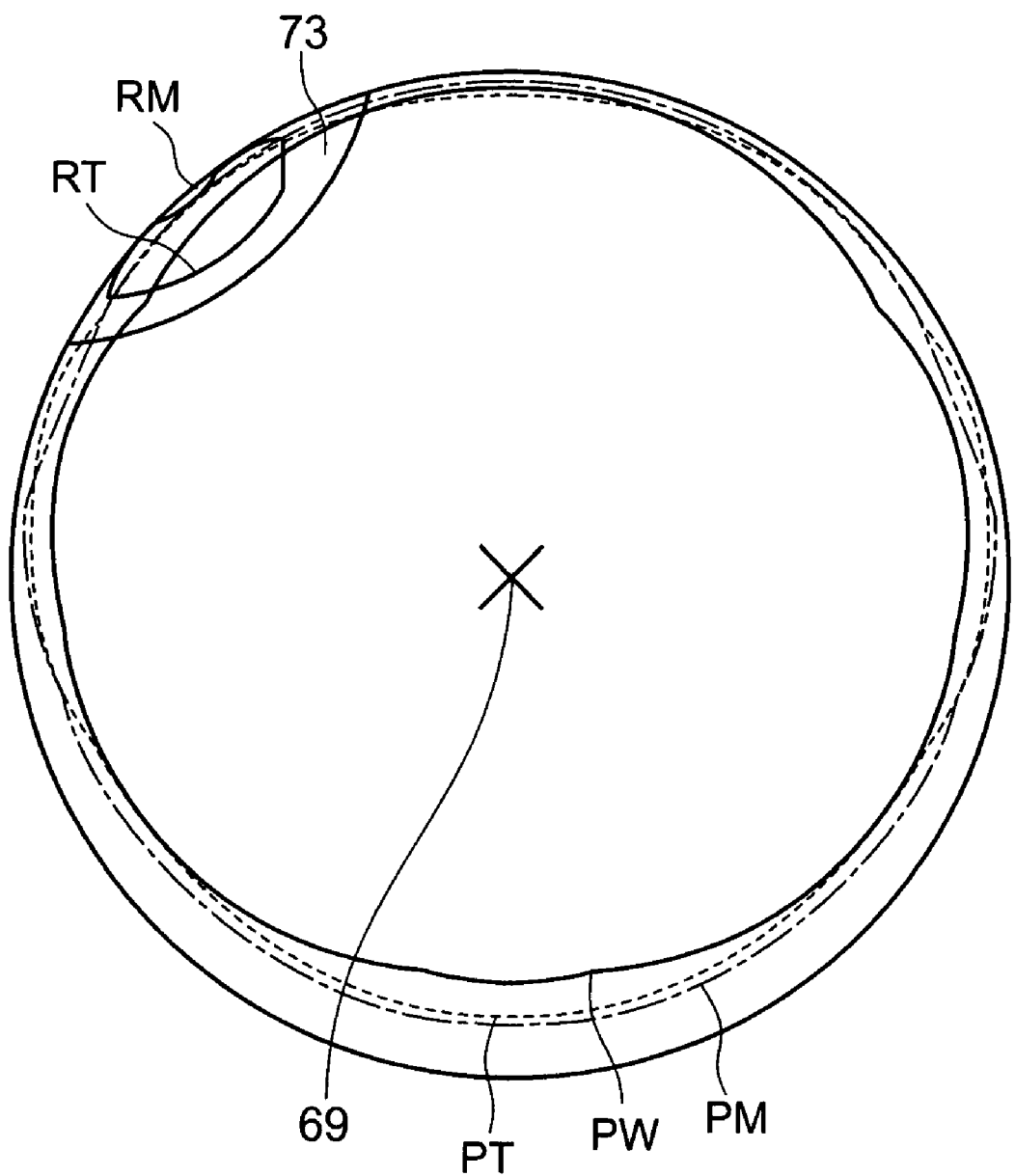
FIG. 14 is a drawing showing a change in the state of the beam of light in the vicinity of the position where the beam of stray light is made densest in the projector according to the invention.

Because of this, a position is obtained through simulations where an area ratio at which the swollen portion 73 intrudes into the respective areas PW, PM, PT of the beam of ON-state light P which change sequentially in that order as the projection lens 60 changes sequentially its state from the wide-angle state, the middle state and the telephoto end state while the swollen portion 73 is cutting off the area of the beam of stray light R as is shown in FIG. 14 in association with the change in the area of the beam of ON-state light P within the airspace defined between the first movable lens component 101 and the second movable lens component 102.

Figure 15:
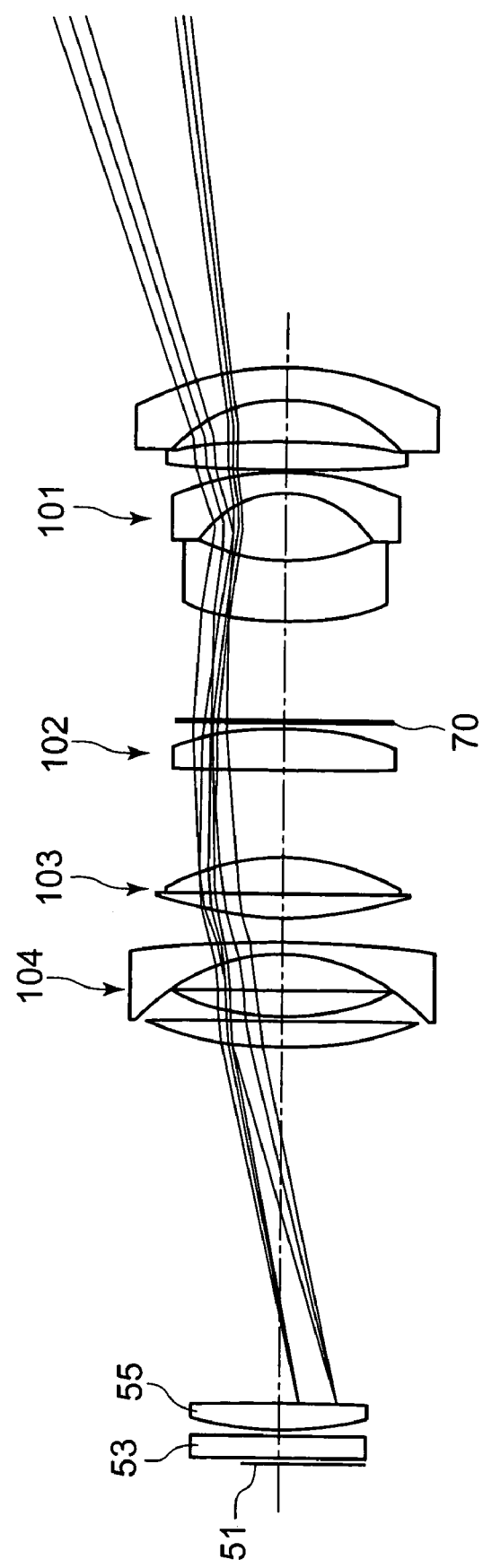
FIG. 15 is a drawing showing exemplarily a state of the beam of stray light in a state in which the projection side optical system is at a middle position in the projector according to the invention.
Figure 16:
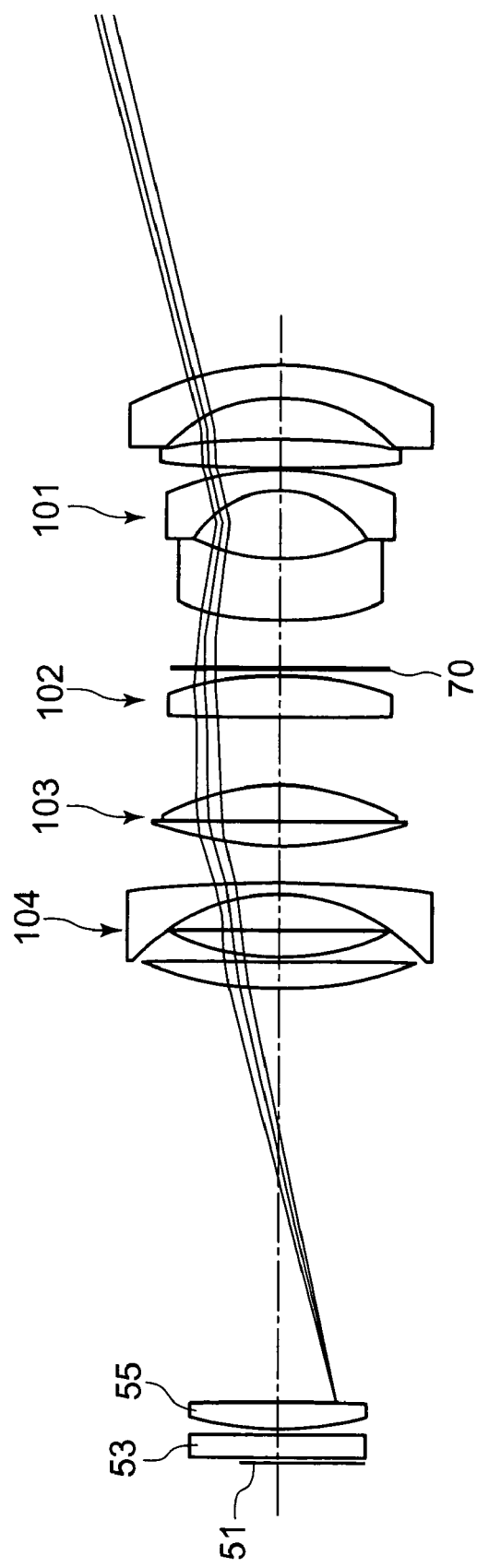
FIG. 16 is a drawing showing exemplarily a state of the beam of stray light in a state in which the projection side optical system is at a telephoto end in the projector according to the invention.

As a result, the position of the movable aperture 70 lies right ahead of the second movable lens component 102 as is shown in FIG. 15 which shows the position of the movable aperture 70 in the middle state and as is shown in FIG. 16 which shows the position thereof in the telephoto end state, whereby the quantity of the beam of ON-state light P which is cut off by the swollen portion when the projection lens 60 is in the middle state and the telephoto end state.

Due to this, while the attenuation ratio of the beam of ON-state light P which results when the beam of ON-state light P is cut off by the swollen portion 73 in the telephoto end state becomes 3.6 percent when the movable aperture 70 lies right ahead of the position of the surface of the second movable lens component 102 shown in FIG. 12, the attenuation ratio is decreased to 3.1 percent with the swollen portion 73 formed slightly ahead of the second movable lens component 102, so as to decrease the cut-off ratio of the beam of ON-state light P.

Figure 17:
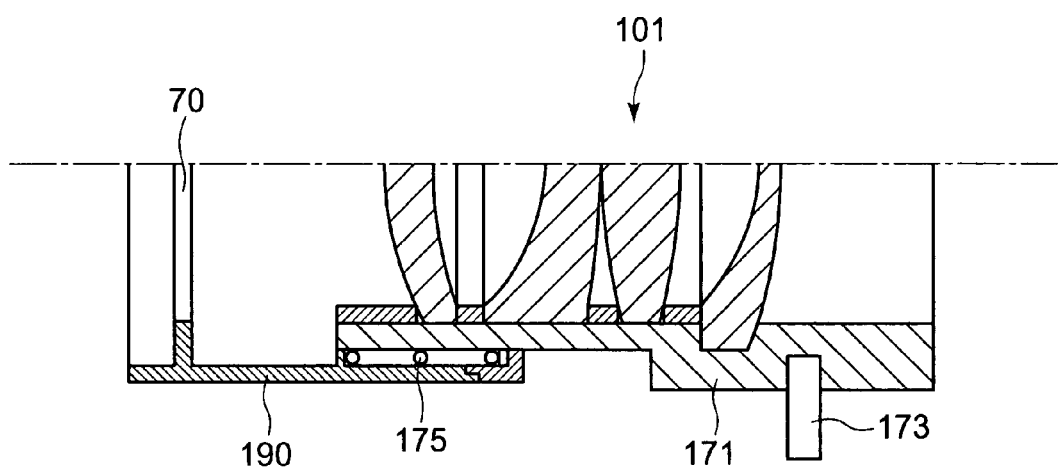
FIG. 17 is a sectional view of a main part of the projector according to the invention which shows an example of a state in which the movable aperture is mounted in the projector.

Then, as is shown in FIG. 17, an end portion of an aperture supporting barrel 190 is slidably fitted on a first lens barrel 171 which fixedly supports the first movable lens component 101 via an elastic material 175 which is put in a compressed state, and the movable aperture 70 with the swollen portion 73 is fixed to the aperture supporting barrel 190 in a position which lies in the vicinity of the other end portion thereof.

Figure 18:
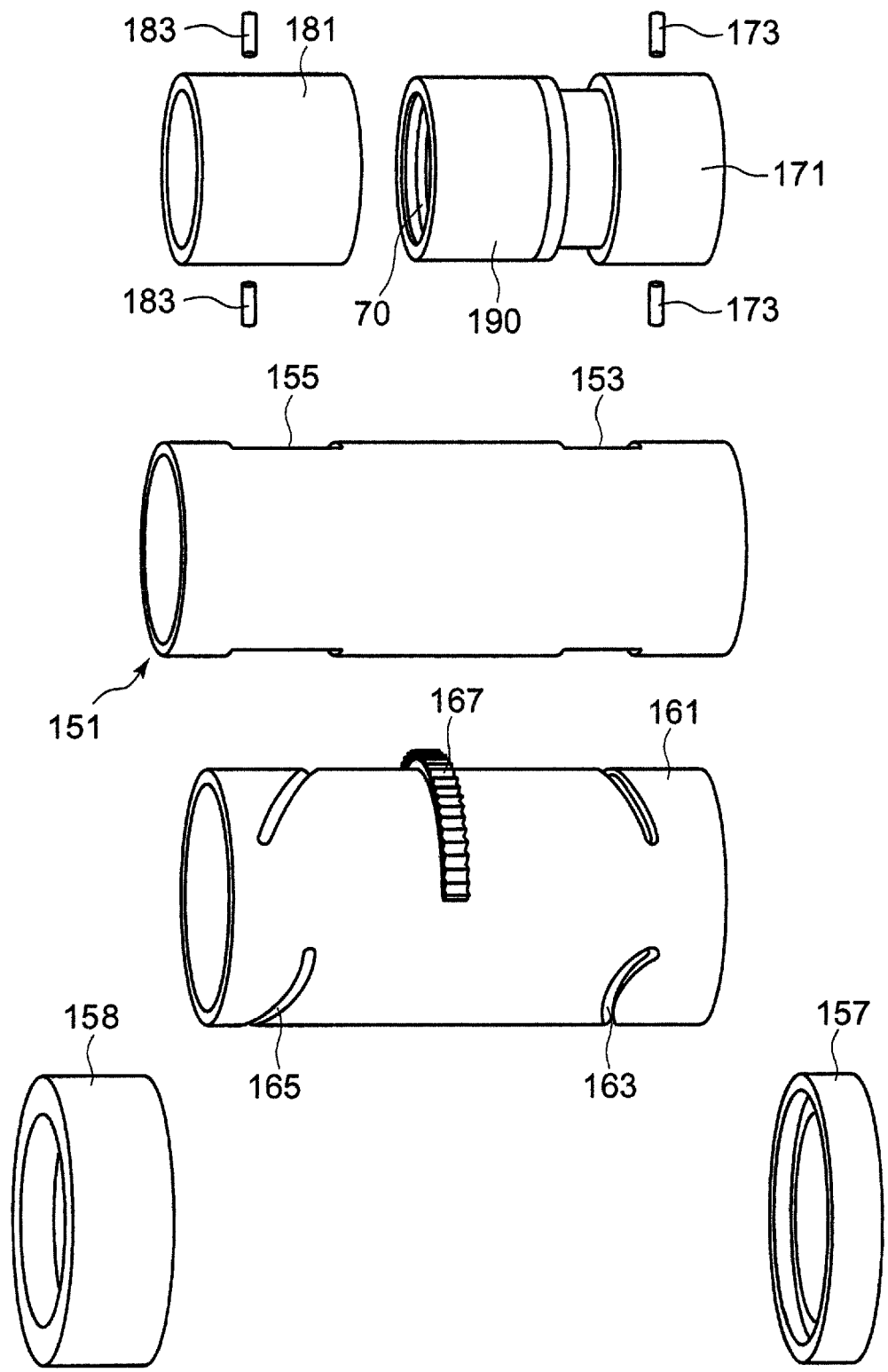
FIG. 18 is an exploded perspective view of a main part of a movable lens component in the projector according to the invention.

As is shown in FIG. 18, the first lens barrel 171 in which the first movable lens element 101 is fixed and a second lens barrel 181 in which the second movable lens element 102 is fixed include cam pins 173, 183 on outer circumferences thereof, respectively, and these first lens barrel 171 and second lens barrel 181 are then installed in a holding barrel 151.

This holding barrel 151 has a rectilinear front sliding groove 153 in the vicinity of an axial front end and a rectilinear rear sliding groove 155 in the vicinity of an axial rear end thereof, and the first lens barrel 171 is accommodated in the interior of the holding barrel 151 in such a manner as to slide in the axial direction with the first cam pin 173 made to project from the front sliding groove 153 at a distal end thereof, and similarly, the second lens barrel 181 is accommodated in the interior of the holding barrel 151 in such a manner as to slide in the axial direction with the second cam pin 183 made to project from the rear sliding groove 155 at a distal end thereof.

Furthermore, this holding barrel 151 is supported by a front fixing barrel 157 at the front end thereof and is supported by a rear fixing barrel 158 at the rear end thereof so as to be fixed in the interior of the projector, and a cam barrel 161 is rotatably held by the front fixing barrel 157 and the rear fixing barrel 158 while its axial movement is restricted by the front fixing barrel 157 and the rear fixing barrel 158, so that the holding barrel 151 is accommodated in the interior of the cam barrel 161.

Then, the cam barrel 161 has a rotating gear 167 which is provided on an outer circumference thereof and a front cam groove 163 and a rear cam groove 165 into which the distal end of the first cam pin 173 and the distal end of the second cam pin 183 are inserted, respectively. When the cam barrel 161 is rotated via the rotating gear 167, the first cam pin 173 and the second cam pin 183 are moved in the axial direction, so as to move the first lens barrel 171 and the second lens barrel 181 in the direction of the optical axis 69.

Note that the third movable lens component 103 and the fourth lens component 104 are also fixed in lens barrels which have cam pins, respectively, and the lens barrel which holds the third movable lens component 103 and the lens barrel which holds the fourth movable lens barrel 104 are slidably mounted in the interior of a holding barrel, whereby the third movable lens component 103 and the fourth lens component 104 are also moved in the optical axis direction by virtue of the rotation of a cam barrel which has cam grooves.

In this way, since the aperture supporting barrel 190 is held by the first lens barrel 171 via the elastic material 175 which is in the compressed state, in the wide-angle end state in which the spaces between the first movable lens component 101 to the fourth movable lens component 104 are expanded as is shown in FIG. 10, the movable aperture 70 can be situated at the densest position V of the beam of stray light R while kept apart from the first movable lens component 101 and the second movable lens component 102, and the movable aperture 70 can be situated in the vicinity of the front of the second movable lens component 102 in the middle state in which the airspace between the first movable lens component 101 and the second movable lens component 102 is narrowed as is shown in FIG. 15.

Then, with the projection lens 60 put in the telephoto end state in which the airspace between the first movable lens component 101 and the second movable lens component 102 is narrowed further as is shown in FIG. 16, the aperture supporting barrel 190 is brought into contact with the second lens barrel 181 to thereby compress the elastic material 175, whereby the movable aperture 70 narrows the interval between the first movable lens component 101 and the second movable lens component 102 with the movable aperture 70 lying closer to the second movable lens component 102.

In this way, the movable aperture 70 with the swollen portion 73 can be moved as the movable lens components move so as to decrease the cut-off ratio of the beam of ON-state light P.

In addition, by being formed into the arc-like shape whose curvature is centered at the center of the beam of stray light R, the swollen portion 73 can cut off as little of necessary ON-state light as possible while effectively cutting off the stray light which is incident on the projection side optical system from the incident side of the projection side optical system.

Additionally, in the event that stray light is attempted to be cut off by the swollen portion 73 while keeping the diameter of the opening 75 constant, the beam of stray light R can be made to approach the position of the optical axis 69 of the projection lens 60, whereby the projector 10 can easily be miniaturized while maintaining a sharp image.

Note that the aperture supporting barrel 190 which fixes the movable aperture 70 is not limited to the configuration in which the aperture supporting barrel 190 is supported by the first lens barrel 171 via the elastic material 175, and hence, a configuration can be adopted in which the aperture supporting barrel 190 is slidably accommodated in the interior of the holding barrel 151, a cam pin is also provided on the aperture supporting barrel 190 in such a manner as to pass through the holding barrel 151, and a cam groove is formed in the cam barrel 161 in such a manner as to allow the movement of the movable aperture therethrough, whereby the movable aperture can be moved in the direction of the optical axis 69 by virtue of the rotation of the cam barrel 161 together with the first lens barrel 171 and the second lens barrel 181.

In addition, while the projection lens 60 shown in FIGS. 10 to 16 is the four-component zoom lens made up of the four lens components which are all movable, the invention is not limited to the four-component construction, and therefore, the projection lens 60 may be made up of more lens components, and projection lenses 60 with various zooming modes can be provided in which only the plurality of rear lens components are made movable, only the plurality of forward lens components are made movable and only the plurality of intermediate lens components are made movable, which constitutes an inner zooming mode.

In addition, in these projection lenses 60, a densest portion V in the zooming state is obtained through simulations where a maximum quantity of stray light passes through the projection lens 60, and the size and configuration of the area of the beam of stray light R at the densest position V are obtained through simulations.

Namely, the provision of the movable aperture 70 and the aperture supporting barrel 190 is not limited to the airspace between the first movable lens component 101 and the second movable lens component 102, and therefore, the position and area configuration of an airspace between lens components where stray light becomes densest are obtained through simulations depending upon the lens configuration of a zoom lens making up the projection lens 60, so that the movable aperture 70 with the swollen portion 73 is movably disposed within the airspace.

Note that the invention is not limited to the embodiment that has been described heretofore, and hence, the invention can be modified and improved freely without departing from the spirit and scope of the invention.

What is claimed is:

1. A projection lens, which is a projection zoom lens for use in a projector utilizing a micromirror display device as a display device, the projection lens comprising a movable aperture adapted to move in an optical axis direction as a movable lens component moves,
   wherein an opening of the movable aperture is formed into a circular shape which is centered at an optical axis of the projection lens,
   wherein the movable aperture has a swollen portion formed on part of a circumferential edge of the opening in such a manner as to project into an inside of the opening in a curvilinear fashion, and
   wherein the swollen portion projects towards the opening from a circumferential edge portion which is in a direction of a center of a beam of stray light relative to a position of the optical axis of the projection lens.

2. The projection lens as set forth in claim 1, wherein the movable aperture is disposed in an airspace between a first lens component and a second lens component such that a distance between a first lens element lying ahead of and a second lens element lying behind the movable aperture is changeable.

3. The projection lens as set forth in claim 1, wherein the movable aperture is fixed to an aperture supporting barrel which is supported via an elastic material on a movable lens barrel in which a given movable lens component is fixed.

4. The projection lens as set forth in claim 1, wherein the movable aperture is fixed to a supporting barrel which is independent from a movable lens barrel in which a given movable lens component is fixed.

5. The projection lens as set forth in claim 1, wherein the swollen portion projects into the inside of the circular opening in an arc-like shape.

6. The projection lens as set forth in claim 5, wherein a center of curvature of the arc-like shape is a position of the center of the beam of stray light.

7. A projector comprising:
   a light source unit,
   a light source side optical system,
   an illumination side optical system,
   a micromirror display device,
   a projection side optical system having a zooming function,
   a power supply circuit, and
   a projector control unit,
   wherein the projection side optical system comprises a movable aperture adapted to move in an optical axis direction as a movable lens component moves in the optical axis direction, and
   wherein the movable aperture includes a circular opening centered at a position of an optical axis of the projection side optical system, and has a swollen portion, formed on a circumferential edge portion that is in a direction of a center of a beam of stray light relative to the center of the opening, in such a manner as to project in a direction of the center of the opening.

8. The projector as set forth in claim 7, wherein the movable aperture is disposed in an airspace between a first lens component and a second lens component such that a distance between a first lens element lying ahead of and a second lens element lying behind the movable aperture is changeable.

9. The projector as set forth in claim 7, wherein the movable aperture is fixed to an aperture supporting barrel which is supported via an elastic material on a movable lens barrel in which a given movable lens component is fixed.

10. The projector as set forth in claim 7, wherein the movable aperture is fixed to a supporting barrel which is independent from a movable lens barrel in which a given movable lens component is fixed.

11. The projector as set forth in claim 7, wherein a DMD is used as the micromirror display device, and wherein the swollen portion projects from the circumferential edge portion towards the opening in an arc-like shape.

12. The projection lens as set forth in claim 2, wherein the movable aperture is fixed to an aperture supporting barrel which is supported via an elastic material on a movable lens barrel in which a given movable lens component is fixed.

13. The projection lens as set forth in claim 2, wherein the movable aperture is fixed to a supporting barrel which is independent from a movable lens barrel in which a given movable lens component is fixed.

14. The projector as set forth in claim 8, wherein the movable aperture is fixed to an aperture supporting barrel which is supported via an elastic material on a movable lens barrel in which a given movable lens component is fixed.

15. The projector as set forth in claim 8, wherein the movable aperture is fixed to a supporting barrel which is independent from a movable lens barrel in which a given movable lens component is fixed.

* * * * *